United States Patent
Liu et al.

(10) Patent No.: US 10,154,553 B2
(45) Date of Patent: Dec. 11, 2018

(54) LED DRIVER AND DRIVING METHOD

(71) Applicant: PHILIPS LIGHTING HOLDING B.V., Eindhoven (NL)

(72) Inventors: Junhu Liu, Shanghai (CN); Xianhui Zhang, Shanghai (CN); Chun Yang, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/579,060

(22) PCT Filed: May 25, 2016

(86) PCT No.: PCT/EP2016/061815
§ 371 (c)(1),
(2) Date: Dec. 1, 2017

(87) PCT Pub. No.: WO2016/193101
PCT Pub. Date: Dec. 8, 2016

(65) Prior Publication Data
US 2018/0177010 A1   Jun. 21, 2018

(30) Foreign Application Priority Data

Jun. 1, 2015 (WO) ................ PCT/CN2015/080500
Aug. 27, 2015 (EP) ..................... 15182795

(51) Int. Cl.
H05B 33/08 (2006.01)
H02M 3/335 (2006.01)
H02M 1/00 (2006.01)

(52) U.S. Cl.
CPC .... *H05B 33/0815* (2013.01); *H02M 3/33523* (2013.01); *H02M 2001/0006* (2013.01);
(Continued)

(58) Field of Classification Search
None
See application file for complete search history.

(56) References Cited

U.S. PATENT DOCUMENTS 5,414,475 A  5/1995 Trzyna et al.
8,416,584 B2  4/2013 Zhan et al.
(Continued)

FOREIGN PATENT DOCUMENTS

WO  2015056161 A1  4/2015

OTHER PUBLICATIONS

TNY263-268, "Tinyswitch-II Family, Enhanced, Energy Efficient, Low Power Off-Line Switcher," Power Integrations, Apr. 2005 (24 Pages).

*Primary Examiner* — Monica C King
*Assistant Examiner* — Jianzi Chen
(74) *Attorney, Agent, or Firm* — Akarsh P. Belagodu

(57) ABSTRACT

An LED driver uses a switch mode power supply either to provide a regulated LED current (in a first mode) that connects directly to the LED arrangement or a regulated LED voltage (in a second mode) to an LED output terminal. An auxiliary power supply is either based on an auxiliary secondary side (i.e. an auxiliary secondary side winding) when in the first mode, or it is based on the regulated LED voltage when in the second mode. The LED driver further comprises an input adapted to receive a standby command for the driver, wherein the main controlling unit is adapted to control the driver in the second mode when receiving the standby command for the driver. In this way, the driver has a single shared stage which can operated in a regulated current (i.e. constant current) mode to drive the LED arrangement directly or a regulated voltage (i.e. constant voltage) mode. It can adaptively change between modes to improve the standby power efficiency. When the load is turned on (e.g. a first mode), the driver may function in
(Continued)

constant current mode, and when the load is turned off (e.g. a second, standby mode), the driver works in constant voltage mode with the output voltage stepped down so that not sufficient to turn on the LED arrangement to be driven by the driver but enough to provide auxiliary power via the auxiliary power supply, in order to improve the auxiliary power efficiency.

14 Claims, 5 Drawing Sheets

(52) U.S. Cl.
CPC .... *H02M 2001/0032* (2013.01); *Y02B 20/347* (2013.01); *Y02B 70/16* (2013.01)

(56) References Cited

U.S. PATENT DOCUMENTS

| | | |
|---|---|---|
| 2010/0039834 A1 | 2/2010 | Moon et al. |
| 2011/0080110 A1 | 4/2011 | Nuhfer et al. |
| 2014/0346874 A1 | 11/2014 | Fang et al. |

LED DRIVER AND DRIVING METHOD

CROSS-REFERENCE TO PRIOR APPLICATIONS

This application is the U.S. National Phase application under 35 U.S.C. § 371 of International Application No. PCT/EP2016/061815, filed on May 25, 2016, which claims the benefit of International Application No. PCT/CN2015/080500, filed on Jun. 1, 2015, and European Patent Application No. 15182795.3, filed on Aug. 27, 2015. These applications are hereby incorporated by reference herein.

FIELD OF THE INVENTION

This invention relates to LED drivers and to driving methods.

BACKGROUND OF THE INVENTION

LED lighting is evolving from fixed output device towards intelligent controllable lighting. This intelligent lighting may include remote dimming functionality, color mixing ability, as well as data collection functionality (for example from on-board sensors such as proximity sensors and temperature sensors). The light output may thus be controlled in various ways to provided value added features.

To make a light unit remotely controllable, normally a main controlling unit (normally microcontroller unit or MCU) is required to be integrated into the electronic control gear (ECG) or driver. The driver then requires an auxiliary power supply provided to the MCU so that it can continuously perform communication and control tasks. This power supply needs to be continuously available.

During a time when the light unit is turned off, with only the MCU and associated communication and control circuit operational, this auxiliary power is referred to as the standby power. This auxiliary power can be derived from the power supply to the light unit fixture.

However, when the light unit is turned off, it is no longer simply possible to tap an auxiliary supply from a transformer used to power the light unit. Instead, another power source is needed. This results in inefficiency and additional circuit cost. There are directives which impose a standby power consumption requirement for the controlling apparatus, for example a maximum 0.5 Watt standby power requirement for a lighting control unit.

There is therefore a need for a low standby power consumption and also for a low cost auxiliary power solution for use in an intelligent LED light solution. The need for such a solution has been recognized. For example, US 2014/0346874 disclosed a known standby power solution, and the circuit is shown in FIG. 1.

The circuit comprises a front end fly back stage 1 which generates a bus voltage and a back end buck stage 2 which regulates the output current. The circuit topology thus consists of two stages. The first stage delivers a constant voltage output and the second stage delivers a constant current output.

The auxiliary power comprises two parts by dividing auxiliary circuits into those which need to be active during a standby mode and those which do not. The two power supplies operate in parallel mode. The auxiliary power efficiency is low because a linear regulator is always active. This circuit also has a dedicated constant current control logic block with added cost and power loss.

US20110080110A1 also discloses a two-stage LED driver with a first stage that regulates its output voltage and a second stage that converts the output voltage of the first stage into regulated current or voltage. The first stage powers an auxiliary supply either from a secondary winding or from its output voltage.

WO2015056161A1 discloses selectively providing power to a control unit using different voltages at different stages of the overall drive unit. The auxiliary supply obtains power either from the bus voltage or from the cathode of the LED.

SUMMARY OF THE INVENTION

There is therefore still a need for a low cost and power efficient system for delivering standby power.

To better address this concern, the invention is defined by the claims.

According to examples in accordance with an aspect of the invention, there is provided an LED driver comprising:
  a switch mode power supply which includes a transformer having a primary side, a first secondary side adapted to connect to an LED arrangement, and a second secondary side, a control block for controlling the switch mode power supply; a feedback unit; a main controlling unit adapted to control the switch mode power supply in two modes:
    a first mode in which: the feedback unit is adapted to provide the control block a feedback of current flowing through the first secondary side and the control block is adapted to control the first secondary side to deliver a regulated LED current to an LED output terminal; and
    a second mode in which: the feedback unit is adapted to provide the control block a feedback of voltage on the first secondary side and the control block is adapted to control the first secondary side to deliver a regulated voltage to the LED output terminal;
  an auxiliary power supply for powering components other than the LED arrangement to be driven by the LED driver;
    an input adapted to receive a standby command for the driver, wherein the main controlling unit is adapted to control the driver in the second mode when receiving the standby command for the driver; and
  a controller for controlling the auxiliary power supply, wherein the controller is adapted to use the second secondary side to power the auxiliary power supply in the first mode and to use the regulated voltage to power the auxiliary power supply in the second mode;
  wherein the regulated voltage is not sufficient to turn on the LED arrangement to be driven by the driver but enough to provide auxiliary power via the auxiliary power supply.

More specifically, the regulated voltage in the second mode is less than the forward voltage of the LED arrangement. In this way, the LED arrangement is not turned on in the second mode.

This arrangement enables auxiliary power to be maintained in a second mode (which may be a standby mode) by deriving a power supply from a regulated voltage applied to the LED arrangement. This voltage is provided by the same switch mode power supply that delivers the regulated LED current in the normal operating mode, so that a single stage design is enabled with few additional components, namely the switch mode power supply drives the LED directly and delivers power to the auxiliary power supply, not using an extra buck converter to drive LED. The switch mode power supply is switchable between current and voltage regulating modes. In normal operation, the second secondary side (which is an auxiliary winding) is used. In this way, high efficiency is obtained during normal operation. However, low power consumption is enabled during the second mode by using the voltage across the LED arrangement as a power supply.

The auxiliary power supply may for example be used to power a main controlling unit which is maintained in second mode, ready to receive user commands.

A main controlling unit may be used to control the switch mode power supply. When the main controlling unit receives an "LED off" command, the main controlling unit may give a signal to set the switch mode power supply (which may comprise a ringing choke converter) to work in the second (standby) mode.

A first monitoring circuit may be provided in the feedback unit for monitoring the LED current flowing from the first secondary winding to the LED output terminal in the first mode. This monitoring circuit is used for feedback control when in the first mode, which is the normal operating mode of the driver. This provides a current feedback loop control. It should be noted that for the first mode, it is also possible to use open loop current control without sensing and feeding back the LED current.

Preferably, said switch mode power supply is a fly-back converter, the first secondary side comprises a secondary winding and a rectifying diode connected to an anode of the LED arrangement, said first monitoring circuit is connected to a sensing resistor in series between the cathode of the LED arrangement and the secondary winding.

A second monitoring circuit may be provided in the feedback unit for monitoring the voltage at the LED output terminal in the second mode. The second monitoring circuit is connected to an interconnection between the rectifying diode and the LED arrangement. This monitoring circuit is used for feedback control when in the second mode which may be a standby mode. This provides a voltage feedback loop control. It should be noted that for the second mode, it is also possible to use open loop voltage control without sensing and feeding back the voltage at the LED output terminal.

The second monitoring circuit may for example comprise a hysteric comparator.

A feedback and control system may be provided for:
controlling a main switch of the switch mode power supply in dependence on the output of the first monitoring circuit to deliver the regulated current in the first mode; and
controlling the main switch in dependence on the output of the second monitoring circuit to deliver the regulated voltage in the second mode.

The same feedback system is used to control the single switch mode power supply for operation in the two modes so that duplication of circuits is avoided and the overall circuit has low component count, low volume, and low cost.

The feedback system may comprise an optical coupler.

The controller may comprise a circuit which comprises:
a first input coupled to the second secondary side;
a first threshold element coupled to the first input and having a first threshold voltage;
a first switch for connecting the first input to an output when a voltage at the first input exceeds the first threshold voltage;
a second input coupled to the LED output terminal;
a second threshold element coupled to the second input and having a second threshold voltage; and
a second switch for connecting the second input to the output when a voltage at the second input exceeds the second threshold voltage; and
the output being connected to an input of the auxiliary power supply.

The controller is in this way implemented as a simple circuit. One of the first and second inputs is coupled to the output (which functions as the auxiliary power supply) depending on their relative voltages.

The first threshold voltage may be greater than the second threshold voltage.

This means that the second (auxiliary) secondary side will be used to generate the output as long as the voltage is greater than the respective first threshold. Only when the second (auxiliary) secondary side voltage drops below the first threshold can the controller switch to the use of the LED output terminal voltage as the auxiliary voltage supply. Thus, the controller automatically selects the second (auxiliary) secondary side when there is sufficient voltage, and switches to the LED output terminal voltage when there is insufficient voltage, for example caused by selection of the second mode. This is particularly useful since the switch mode power supply can be controlled to adjust its output to trigger the selection of the controller. More specifically, when the switch mode power supply is set to power the LED, the second (auxiliary) secondary side would normally provide a relatively high inductive voltage thus the first threshold can be reached. Further, in the standby mode, the switch mode power supply lowers its output voltage below the forward voltage of the LED arrangement so as to turn off the LEDs, and the second (auxiliary) secondary side would not provide an enough voltage thus the first switch would not be enabled, and in turn the controller would select the second switch. This selector does not need a dedicated control signal to indicate how to select the supply, instead, it is adaptively operating when needed.

The first switch may comprise a first bipolar transistor, with the collector coupled to the first input, the emitter coupled to the output and the base connected to the first threshold element, and the second switch may comprise a second bipolar transistor, with the collector coupled to the second input, the emitter coupled to the output and the base connected to the second threshold element.

This provides a simple implementation of an OR function. The first and second threshold elements for example comprise Zener diodes.

The switch mode power supply may further be adapted to be controlled in a third mode in which the first secondary side provides a regulated voltage to an open circuit LED output terminal, which voltage is sufficient to turn on the LED arrangement to be driven by the driver.

This mode is used for open circuit protection testing in product compliance testing. The LED is not connected, but the voltage is provided so that the LED will emit light as soon as it is re-connected.

A main controlling unit may be provided which is adapted to:
control the switch mode power supply in the first mode when receiving an ON command for the driver and the LED current is higher than a threshold;
control the switch mode power supply in the third mode when receiving the ON command but the monitored LED current is less than the threshold.

The driver is thus controlled based on an LED control command, or lamp control command.

The auxiliary power supply may comprise a DC linear voltage regulator, and the component other than the LED arrangement comprises a master control unit.

The DC linear voltage regulator is for example a low dropout regulator with good efficiency when the input and output gap is in a reasonably small range.

The invention also provides an LED driving method comprising:

operating a switch mode power supply, which includes a transformer having a primary side, a first secondary side that connects to an LED arrangement and a second secondary side, in two modes:

an first mode in which the first secondary side provides a regulated LED current to an LED arrangement; and a second mode in which the first secondary side provides a regulated LED voltage to the LED arrangement, wherein the regulated voltage is not sufficient to turn on the LED arrangement to be driven by the driver but enough to provide auxiliary power via the auxiliary power supply;

powering components other than the LED arrangement using an auxiliary power supply, wherein the method comprising using the second secondary side to power the auxiliary power supply in the first mode and receiving a standby command for the driver, and controlling the driver in the second mode when receiving the standby command for the driver and using the regulated LED voltage to power the auxiliary power supply in the second mode.

Again, the LED standby voltage is preferably not sufficient to turn on the LED arrangement.

The method may comprise monitoring the voltage at the LED arrangement, monitoring the current flowing to the LED arrangement, and controlling a main switch of the switch mode power supply in dependence on the monitored voltage and current flowing to deliver the regulated current in the first mode and the regulated LED voltage in the second mode.

The method may comprise comparing the voltages at the second secondary side and at the LED arrangement with respective thresholds, and generating the auxiliary power supply from the higher of the voltages.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an LED driver which uses a switch mode power supply either to provide a regulated LED current (in a first mode) or a regulated voltage (in a second mode) to an LED output terminal. An auxiliary power supply is either based on an auxiliary secondary side (i.e. an auxiliary secondary side winding) when in the first mode, or it is based on the regulated voltage at the LED output terminal when in the second mode. A controller is used to select power from either the voltage at the auxiliary secondary side or the regulated voltage at the LED output terminal.

In this way, the driver has a single shared stage which can be operated in a regulated current (i.e. constant current) mode or a regulated voltage (i.e. constant voltage) mode. It can adaptively change between modes to improve the standby power efficiency. When the load is turned on, the driver may function in constant current mode, and when the load is turned off (e.g. a second, standby mode), the driver works in constant voltage mode with the output voltage stepped down to improve the auxiliary power efficiency.

Figure 1:
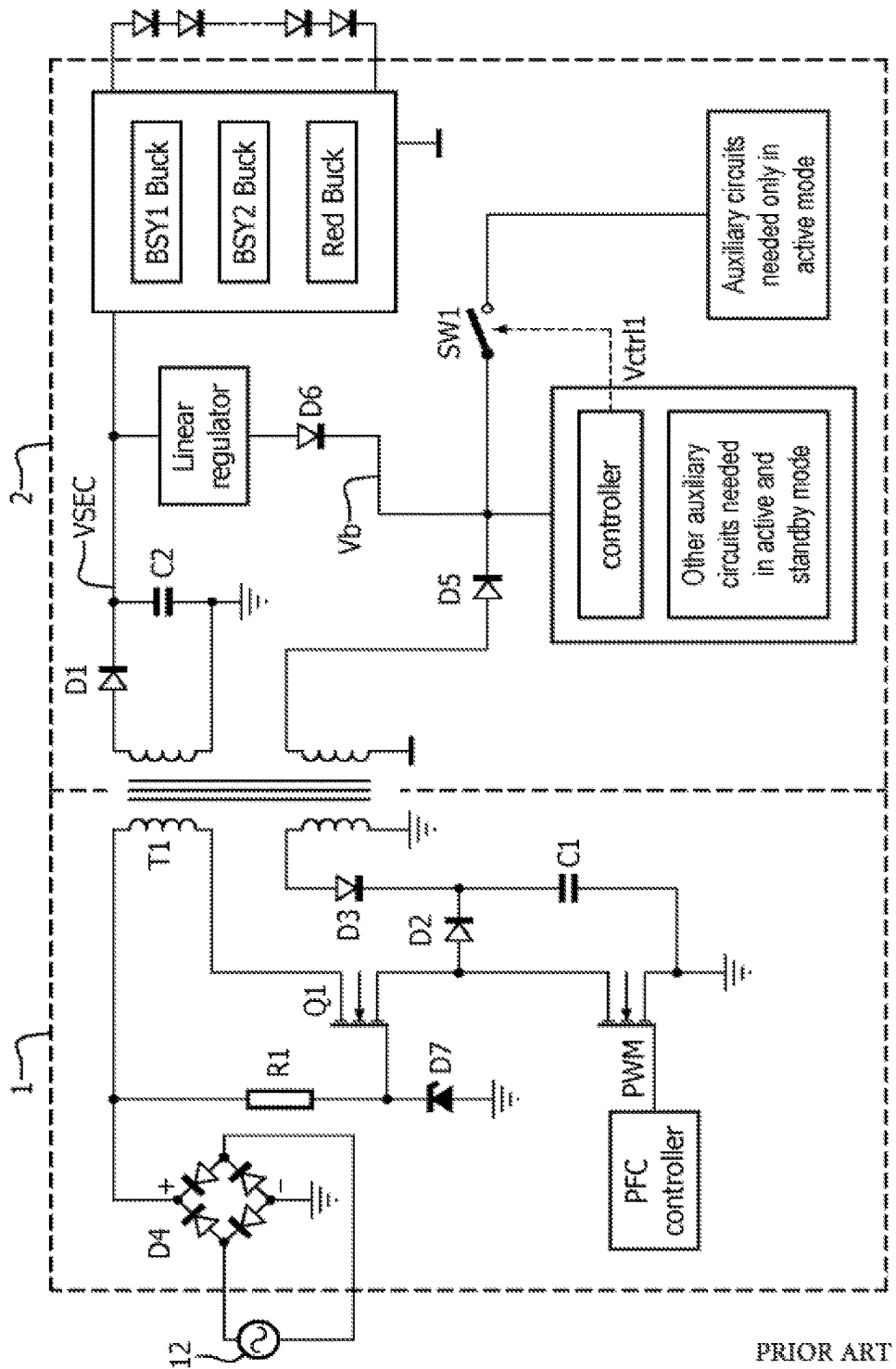
FIG. 1 shows a known driver circuit which generates an auxiliary supply.
Figure 2:
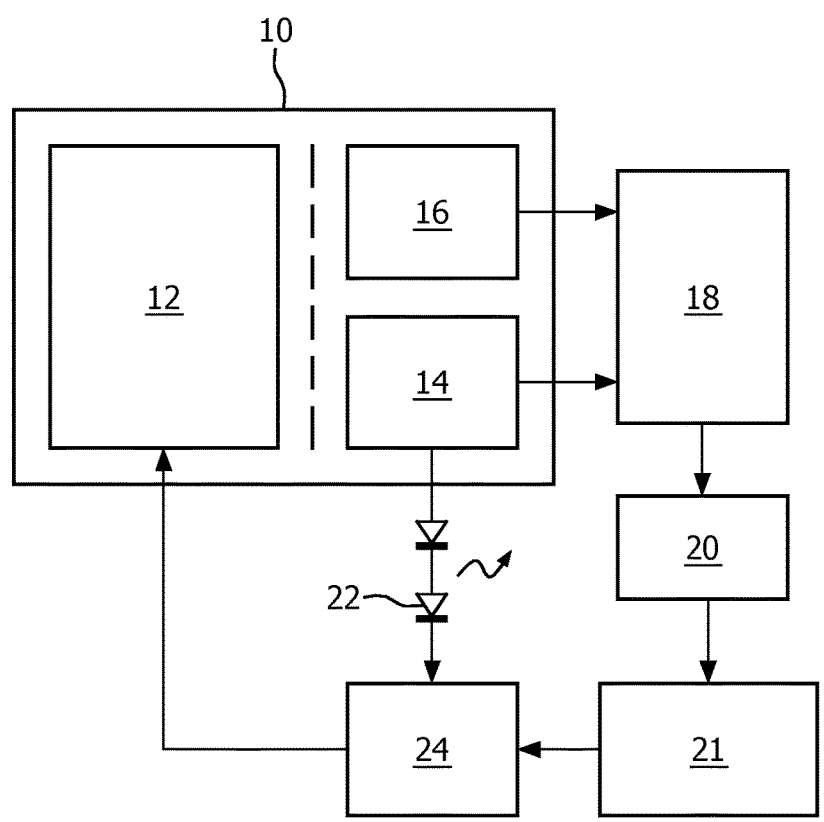
FIG. 2 shows a driver in schematic form.

FIG. 2 shows the driver in schematic form.

The driver comprises a switch mode power supply 10 which includes a transformer having a primary side 12, a first secondary side 14 and a second secondary side 16.

The second secondary side 16 is formed by an auxiliary secondary winding of the transformer, whereas the first secondary side 14 is the main output winding of the transformer. The two outputs are provided to an input selector 18 of the controller, which input selector selects one from the two outputs to drive a low drop out regulator 20 which then provides an input power to a main controlling unit 21. This controlling unit 21 is the master control unit of the lamp, such as an MCU that controls the overall driver circuit. The input selector 18 thus functions to select a power supply for the controlling unit 21. In a more general solution, the input selector 18 selects power supply for components other than the LED arrangement 22 to be driven by the LED driver/switch mode power supply, such component may be a wired or wireless communication interface such as RF transceiver. Such components may be connected to the low drop out regulator 20 or directly to the output of the input selector 18.

The switch mode power supply can be controlled in at least two modes as described below.

In a first, main operation mode (which may be called a normal mode), the first secondary side 14 provides a regulated LED current to an LED output terminal and then to the LED load 22. In a second mode or standby mode, the first secondary side 14 provides a regulated voltage to the LED output terminal.

The second secondary side (i.e. the auxiliary winding 16) is used to provide the auxiliary power supply namely being selected by the input selector of the controller in the first mode, whereas the regulated voltage from the first secondary side (i.e. the main secondary side winding 14) is used to provide the auxiliary power supply namely being selected by the input selector of the controller in the second mode.

There is feedback from the secondary side to the primary side by a feedback unit 24, to control the switch mode power supply 10 in an active manner.

During a standby mode, the auxiliary power supply is provided by the regulated voltage from the main secondary winding 14, rather than from an auxiliary winding 16 or from a separate power supply. This provides a low cost, low standby power consumption mechanism to make sure the total standby power consumption is low during the standby time. However, the auxiliary power is generated with high efficiency during the normal operation mode.

To avoid LED output during the standby mode, the regulated voltage is set within a voltage range which is high enough to provide suitable auxiliary power, but low enough to not to drive the LEDs on, such as lower than the LED forward voltage.

In this way, there is a low cost, low standby power solution for example suitable for a fly back topology, a buck topology, and a buck-boost topology intelligent driver.

The feedback unit 24 provides voltage feedback during the voltage regulating mode and current feedback during the current regulating mode.

Figure 3:
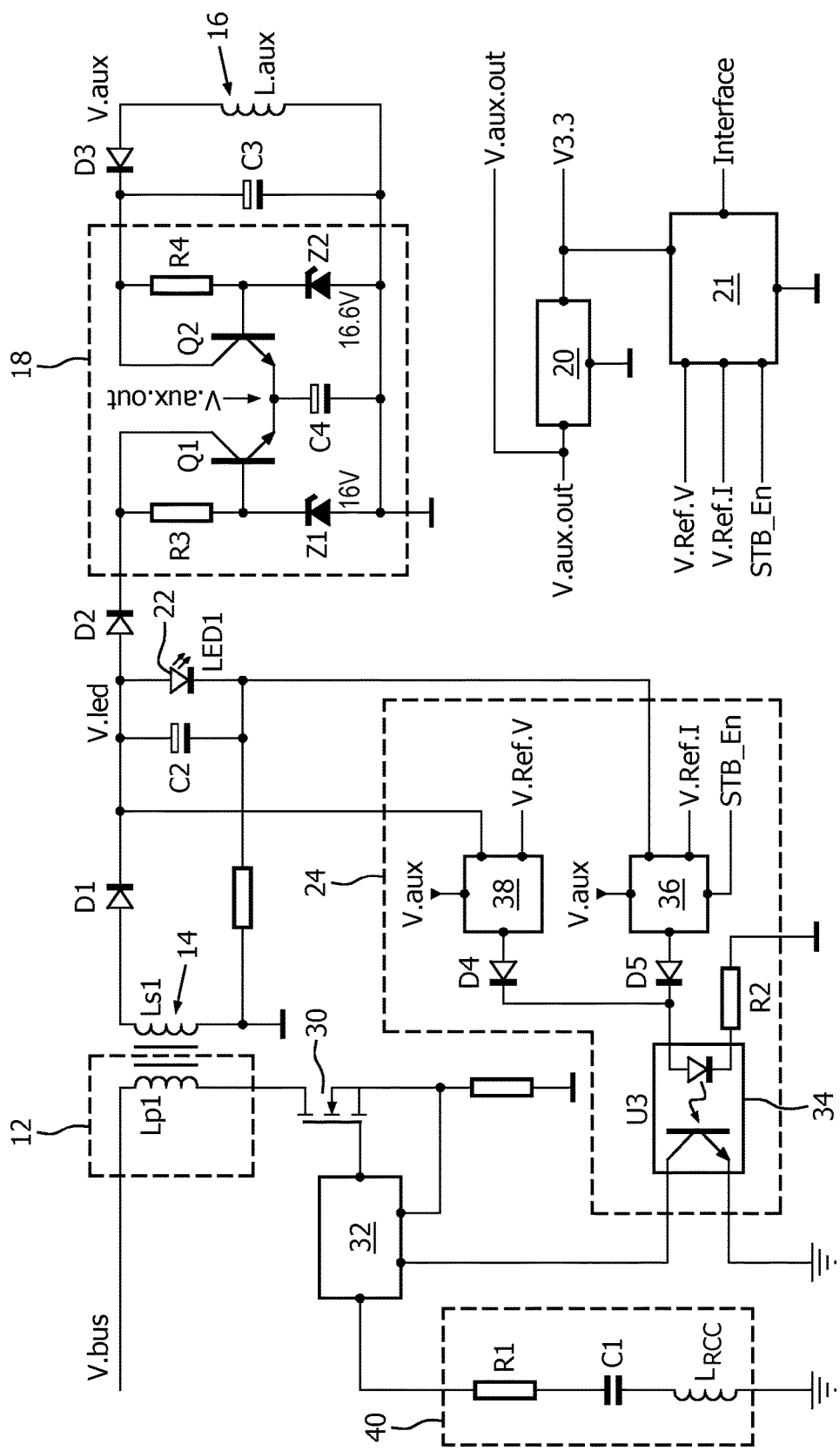
FIG. 3 shows an example of the circuit of FIG. 2 in more detail.

FIG. 3 shows an example of the circuit in more detail, using the same references as in FIG. 2 to denote the corresponding components. For simplicity, the second secondary side winding 16 is shown remote from the main transformer. This winding 16, in combination with associated diode D3 and capacitor C3 provide the signal V.aux during normal operation.

The switch mode power supply has a main switch 30 which is controlled by a control block 32. This switch controls the flow of current through the primary winding 12 of the transformer and controls how the primary winding 12 delivers power to the main secondary winding 14 and the auxiliary coil winding 16. The main secondary winding 14 delivers power to the LED load 22. The resulting voltage is provided to the input selector 18. The voltage on the auxiliary coil winding 16, which is termed V.aux, is also provided to the input selector 18, and one of them is used to define the auxiliary output voltage, which is termed V.aux.out. The operation of the input selector 18 is discussed further below.

This output V.aux.out is provided to the low drop out (LDO) regulator 20, and the output of the LDO regulator is provided to the controlling unit 21. The controlling unit 21 controls the feedback unit 24 so that it is providing current feedback information for the regulated current mode, and voltage feedback for the regulated voltage mode. The feedback unit 24 has an optical coupler 34. It also has a first, current monitoring circuit 36 that monitors the current flowing through the LED load 22 wherein a current reference of the first monitoring circuit 36 is provided by the controlling unit 21. The first monitoring circuit 36 is enabled during the first, normal mode. The feedback unit 24 also has a second, voltage monitoring circuit 38 that monitors the voltage provided to the LED load 22 wherein a voltage reference of the second monitoring circuit 38 is provided by the controlling unit 21. The second monitoring circuit 38 is enabled during the second, standby mode.

The second, voltage monitoring circuit 38 is a hysteric comparator that enables the main switch 30 when the voltage V.led is lower than a lower limit, and disables the main switch 30 when the voltage V.led higher than a higher limit. This provides active control of the main switch using feedback.

The input selector 18 has power source selection logic implemented by Zener diodes Z1, Z2 and transistors Q1, Q2 to adaptively select the auxiliary input power source. It draws power from the auxiliary winding 16 during normal operation, and draws power from the V.led bus during standby mode. The feedback unit 24 includes control logic implemented by diodes D4, D5 and an enable signal STB_En to enable the main switch 30 to be controlled by an LED current feedback loop or an LED voltage feedback loop.

Control logic for the ringing choke converter is defined by circuit block 40 which connects to the control block 32. The series inductor $L_{RCC}$, capacitor C1, and resistor R1 form a circuit to control the main switch 30 ON/Off. The inductor is coupled with the inductor of the primary side 12, and is an auxiliary coil of the transformer. Energy is stored in the primary side 12 while the main switch 30 is ON, and release to the output side when the main switch 30 is OFF.

By suitable parameter selection of the input selector 18 and the coil turns, the auxiliary coil 16 is used during normal operation, and the use of the voltage V.led to form the auxiliary supply is disabled. A suitable turn ratio selection means the power from the auxiliary coil is just adequate as the auxiliary supply during normal operation, so that the auxiliary power efficiency is high during the normal operating mode. During the standby mode, when the LED load is turned off, very limited or no energy can be drawn from the auxiliary coil 16 due to very small turn on duty cycle, and the voltage the V.aux will drop. When it falls below a threshold, the auxiliary power supply starts to be drawn from the LED voltage via the selector 18. The switch mode power supply will then be switched to a constant voltage mode with a low level output, and the auxiliary power supply can thus still be keep at high efficiency in a LDO step down mode.

In a further embodiment, there is also a third mode of operation. The main driver controlling unit 21 is able to distinguish between an LED open circuit mode and the standby mode, then an open circuit protection feature may be provided. In standby mode, the controlling unit 21 may set the enable signal STB_En low, so that the driver is in standby mode so that the LED current should be zero. The controlling unit then sets the voltage V.led to the desired low level. If there is an LED open circuit, the controlling unit will not have set the STB_En signal. By detecting the lack of output current (in unit 36) when the standby mode is not enabled, the controlling unit can recognize the open circuit. The controlling unit will then not set the voltage V.led to the low level, and also shall not switch to the constant current regulation mode as this will result in the voltage V.led reaching very high levels and finally the circuit will be damaged. Instead, in this open circuit protection mode, the controlling unit can set the voltage V.led to a voltage level sufficient to turn on the LEDs if they are reconnected to the previously open circuit. More specifically, the voltage level may be a bit higher than the forward voltage of the LEDs. This mode can be used during in-factory or compliance testing as the LED load can be directly plugged out, and then plugged in again for testing the LED are immediately driven without needing a driver re-start. In case the LEDs are plugged in again, since the voltage is higher than the forward voltage, the LEDs are immediately driven. Furthermore, the LED current is detected again, so in turn the controlling unit may switch from the third, open protection mode back to the first, normal mode to drive the LEDs.

Figure 4:
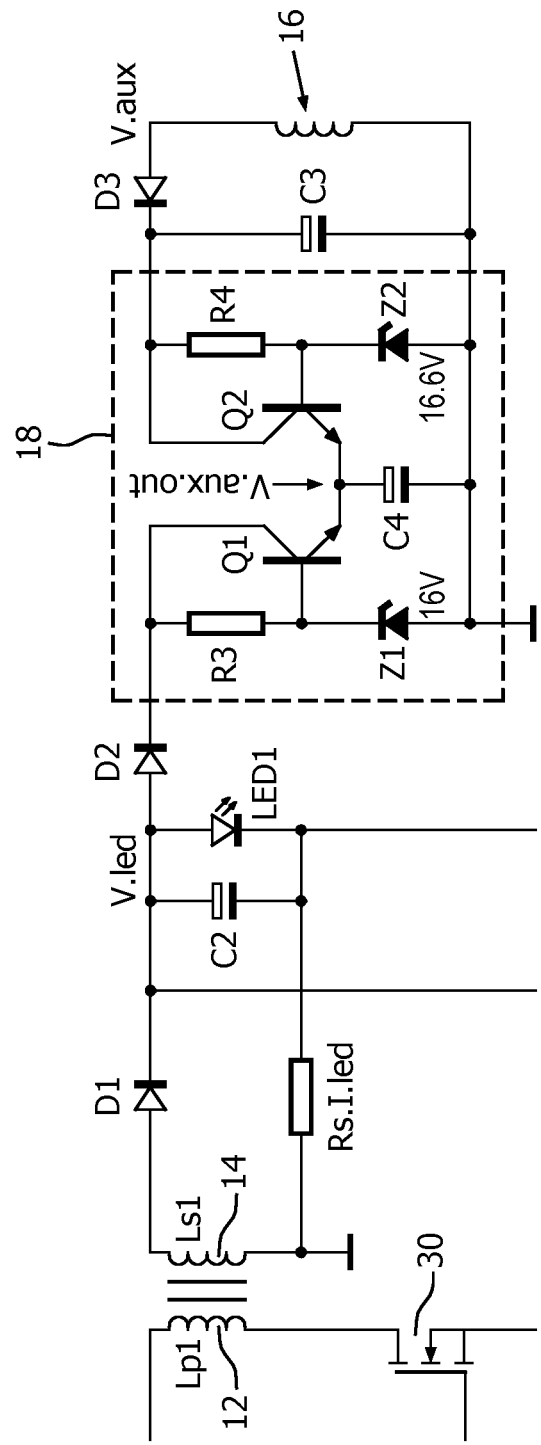
FIG. 4 shows the input selector in more detail.

FIG. 4 shows the input selector 18 in more detail.

It comprises a first input V.aux provided from the second secondary side 16 (also called the auxiliary winding), which is received through a diode D3. A first threshold element Z2 is coupled to the first input and has a first threshold voltage, in this example 16.6V. A first switch Q2 connects the first input V.aux (after the diode D3) to an output V.aux.out when the first input exceeds the first threshold. In particular, the first switch Q2 comprises a first bipolar transistor, with the collector coupled to the first input V.aux (but after diode D3), the emitter coupled to the output V.aux.out and the base connected to the first threshold element Z2.

A second input V.led is provided from the LED output terminal through diode D2. A second threshold element Z1 is coupled to the second input V.led (after the diode D2) and has a second threshold voltage, in this example 16.0V (i.e. lower than the first). A second switch Q1 connects the second input V.led to the output V.aux.out when the second input exceeds the second threshold. The second switch Q1 also comprises a bipolar transistor, with the collector coupled to the second input V.led, the emitter coupled to the output V.aux.out and the base connected to the second threshold element.

During normal operation, the auxiliary power will be drawn from the coil 16. When the main switch 30 is controlled by the ringing choke converter oscillation and is operating normally in the first mode, the auxiliary winding 16 receives energy transferred from the primary winding 12 and delivers it as V.aux.out via D3 and Q2. The voltage generated from the coil 16 is a voltage level that just enough to driver auxiliary power to make the auxiliary power efficiency high during operating mode. The capacitor C3 is a bulk capacitor for the coil 16. The Zener diode Z2 dictates the output voltage V.aux.out when power is delivered from the coil 16.

This auxiliary coil 16 takes precedence over the voltage V.led. The voltage V.led is only used when the auxiliary coil 16 does not deliver enough energy to reach the threshold voltage of the element Z2. In particular, when both V.led and V.aux are available, V.aux.out will be determined to be provided by Z1 or Z2, whichever is higher. For instance, in the first mode, the voltage on the auxiliary winding 16 is high enough, Q2 is conductive and Z2 breaks down. Since Z2 has 16.6V and $V_{Q2.BE}$=0.6V, then V.aux.out will be at 16.6−0.6=16V. As Z1 is selected at 16.0V, so $V_{Q1.BE}$=16V−16V=0V<0.6V, which disables the transistor Q1 from conducting. Consequently, power will source from the auxiliary coil 16. In the situation when the switch mode power supply is controlled as a voltage source and provides output voltage less than the forward voltage of the LEDs, the auxiliary coil 16 will no longer have enough energy to make Q2 conductive and cannot maintain V.aux.out at 16V. When V.aux.out drops to 15.4V and below, $V_{Q1.BE}$=16.0-15.4=0.6V or greater, which will turn on the transistor Q1 which will conduct and power will be drawn from the V.led bus.

Figure 5:
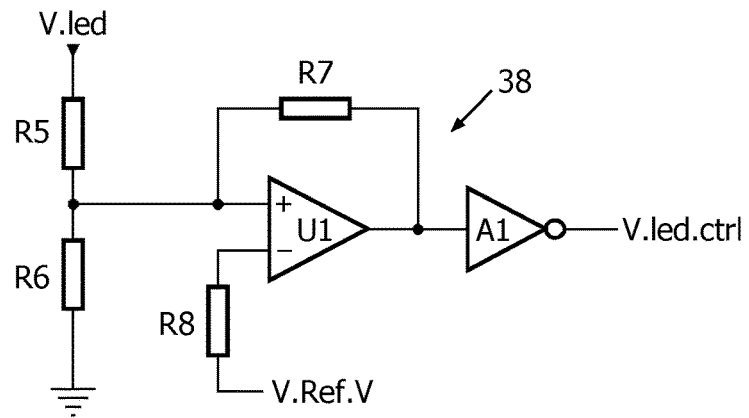
FIG. 5 shows an implementation of the second monitoring circuit.

FIG. 5 shows an implementation of the second monitoring circuit 38 for monitoring the LED voltage V.led. The voltage is converted by a resistive divider R5, R6 and compared with a reference using a comparator U1 with hysteresis. The output is a command for tuning the duty cycle of the main switch 30 and it is provided to the RCC control block 32 by the feedback unit. During the standby mode, the switch mode converter is controlled to achieve a pre-defined output voltage V.led that is then used for auxiliary power. This pre-defined voltage V.led is in a range that high enough to power the auxiliary power, but low enough to not turn on LED load. The voltage V.led may be regulated around the reference level V.Ref.V which is provided by the controlling unit 21. During standby mode, the LED should be turned off.

The use of a hysteric comparator enables the V.led voltage to be measured and controlled. In this way, the feedback ensures that the main switch 30 causes the voltage V.led to stay within a range in V.low.limit<V.led<V.upper.limit. In this range, V.low.limit may be equal to V.Ref.V minus an offset while V.upper.limit may be equal to V.Ref.V plus an offset.

The upper limit is a voltage level that is low enough not to drive the LED on; and the lower limit is a voltage level that is high enough to provide enough auxiliary power.

When V.led drops to below the low limit, it will result in the comparator outputting a "0" which will be inverted by A1 to "1". This "1" signal is for increasing the duty cycle of the main switch via the opto-coupler and RCC control circuit, so as to deliver more power. When V.led increases to certain level, the input signal will be higher than the inverter reference with a "1" output from the comparator which is inverted to "0". This is used to decreasing the duty cycle of the main switch so as to deliver less power. The resistors R5, R6, and R7 define the hysteresis behavior so that the voltage V.led can be controlled in a predefined range. The high and low limited can be determined by R5, R6, R7, and V.Ref.V. The V.Ref.V can be generated by the main controlling unit 21.

Figure 6:
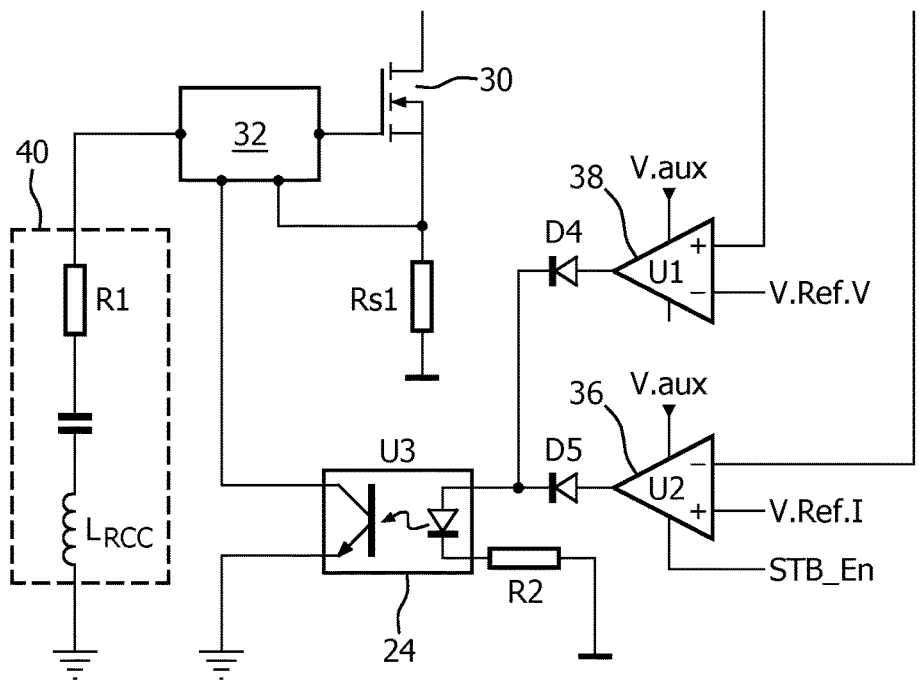
FIG. 6 shows the control logic for the main switch in more detail.

FIG. 6 shows the control logic for the main switch 30 in more detail. The monitoring circuits 36,38 respectively provide constant current control and constant voltage control. During normal operation, the LED string should be maintained at a desired current level, so the signal STB_En is enabled, and the circuit 36 works to regulate the LED current based on the reference value V.Ref.I with a consequent LED bus forward voltage which is high than a lower threshold of the circuit 38 so that the circuit 38 will not be actuated. The value V.Ref.I is provided by the controlling unit 21 according to a command received via the interface, such as a dimming level. During the standby mode, the main controlling unit of the driver will output the STB_En disable signal which means the output of the circuit 36 is disabled. Hence the monitoring circuit 38 will take over the control when the voltage V.led drops to a level lower than the threshold set. As shown in the diagram, diodes D4, D5, and the enable signal STB_En in conjunction implement the control selection.

If a high accuracy auxiliary voltage is required a low drop out regulator can be used to generate the output auxiliary voltage. Peak current control can be used to control the ringing choke converter oscillation peak current, and the monitoring circuits are used to control the LED bus voltage or LED current.

The same approach can be used in a control scheme based on a constant on time. In this case, the RCC self-oscillation is timed to control the energy output to the secondary side.

The detail of the ringing choke converter operation is not discussed in detail as this is standard.

This invention is of particular interest for LED lighting applications for example with intelligent LED lighting that enables remote control or enables control of additional device which request a standby power. The invention may be used to enable low power consumption in standby mode such as 0.5 Watt or below.

The example above is based on fly back LED driver, but the concept can be extended to a buck topology and a buck-boost topology.

The switch mode power supply in the example above is based on a ringing choke converter. However, other types of switch mode power supply may instead be used. For example, a pulse width modulator circuit may be used to control the main switch of the switch mode power converter based on the feedback information provided.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A LED driver comprising:
   a switch mode power supply comprising:
      a transformer having a primary side, and a first secondary side adapted to connect to an LED arrangement,
      a control block for controlling the switch mode power supply;

a feedback unit;
a main controlling unit adapted to control the switch mode power supply in two modes:
  a first mode in which: the feedback unit is adapted to provide the control block a feedback of current flowing through the first secondary side and the control block is adapted to control the first secondary side to deliver a regulated LED current to an LED output terminal; and
  a second mode in which: the feedback unit is adapted to provide the control block a feedback of voltage on the first secondary side and the control block is adapted to control the first secondary side (16) to deliver a regulated voltage to the LED output terminal;
an auxiliary power supply for powering components other than the LED arrangement to be driven by the LED driver;
an input (interface) adapted to receive a standby command for the driver, wherein the main controlling unit is adapted to control the driver in the second mode when receiving the standby command for the driver and
a controller for controlling the auxiliary power supply, wherein the controller is adapted to use the regulated voltage to power the auxiliary power supply in the second mode;
wherein the main controlling unit is adapted to control that the regulated voltage is not sufficient to turn on the LED arrangement to be driven by the driver but enough to provide auxiliary power via the auxiliary power supply.

2. The driver as claimed in claim 1, wherein said transformer further has a second secondary side, and the controller is further adapted to use the second secondary side to power the auxiliary power supply in the first mode,
wherein the feedback unit comprises a first monitoring circuit for monitoring the LED current flowing from the first secondary winding to the LED output terminal in the first mode, said switch mode power supply is a fly-back converter, the first secondary side comprises a secondary winding and a rectifying diode connected to an anode of the LED arrangement, said first monitoring circuit is connected to a sensing resistor in series between the cathode of the LED arrangement and the secondary winding.

3. The driver as claimed in claim 2, wherein the feedback unit comprises a second monitoring circuit for monitoring the voltage at the LED output terminal in the second mode, and the second monitoring circuit is connected to an interconnection between the rectifying diode and the LED arrangement.

4. The driver as claimed in claim 3, wherein the feedback circuit is adapted for:
controlling a main switch of the switch mode power supply in dependence on the output of the first monitoring circuit to deliver the regulated current in the first mode; and
controlling the main switch in dependence on the output of the second monitoring circuit to deliver the regulated voltage in the second mode.

5. The driver as claimed in claim 4, wherein the feedback system comprises an optical coupler and a unit for tuning the duty cycle of the switch mode power supply according to the output of either the first monitoring circuit (36) or the second monitoring circuit.

6. The driver as claimed in claim 1, wherein the controller comprises an input selector which comprises:
  a first input coupled to the second secondary side;
  a first threshold element coupled to the first input and having a first threshold voltage;
  a first switch for connecting the first input to an output when a voltage at the first input exceeds the first threshold voltage;
  a second input coupled to the LED output terminal;
  a second threshold element coupled to the second input and having a second threshold voltage; and
  a second switch for connecting the second input to the output when a voltage at the second input exceeds the second threshold voltage; and
  the output being connected to an input of the auxiliary power supply.

7. The driver as claimed in claim 6, wherein the first threshold voltage is greater than the second threshold voltage.

8. The driver as claimed in claim 6, wherein the first switch comprises a first bipolar transistor, with the collector coupled to the first input, the emitter coupled to the output and the base connected to the first threshold element, and
the second switch comprises a second bipolar transistor, with the collector coupled to the second input, the emitter coupled to the output and the base connected to the second threshold element.

9. The driver as claimed in claim 1, wherein the switch mode power supply is further adapted to be controlled in a third mode in which the first secondary side provides a regulated voltage to the LED output terminal, which voltage is sufficient to turn on the LED arrangement to be driven by the driver.

10. The driver as claimed in claim 9, wherein the main controlling unit is further adapted to:
control the driver in the first mode when receiving an ON command for the driver and the LED current is higher than a threshold; and
control the driver in the third mode when receiving the ON command but the LED current is less than the threshold.

11. The driver as claimed in claim 1, wherein said auxiliary power supply is adapted to power a DC linear voltage regulator which in turn powers the components other than the LED arrangement, and the components other than the LED arrangement comprise a master control unit.

12. A LED driving method comprising:
operating a switch mode power supply, which includes a transformer having a primary side, a first secondary side that connects to an LED arrangement and a second secondary side, in two modes:
  an first mode in which the first secondary side provides a regulated LED current to an LED arrangement; and
  a second mode in which the first secondary side provides a regulated voltage to the LED arrangement wherein the regulated voltage is not sufficient to turn on the LED arrangement to be driven by the driver but enough to provide auxiliary power via the auxiliary power supply;
powering components other than the LED arrangement using an auxiliary power supply,
wherein the method comprising:
using the second secondary side to power the auxiliary power supply in the first mode;
receiving a standby command for the driver, and controlling the driver in the second mode when receiving the standby command for the driver and using the regulated voltage to power the auxiliary power supply in the second mode.

13. A method comprising the driver as claimed in claim 12, comprising monitoring the voltage at the LED arrangement, monitoring the current flowing to the LED arrangement, and controlling a main switch of the switch mode power supply in dependence on the monitored voltage and current flowing to deliver the regulated current in the first mode and the regulated LED voltage in the second mode.

14. A method comprising the driver as claimed in claim 12, comprising comparing the voltages at the second secondary side and at the LED arrangement with respective thresholds, and generating the auxiliary power supply from the higher of the voltages.

* * * * *